(12) United States Patent
Aoki et al.

(10) Patent No.: US 6,222,720 B1
(45) Date of Patent: Apr. 24, 2001

(54) ELECTRIC DOUBLE LAYER CAPACITOR

(75) Inventors: Tomonori Aoki; Makoto Inoue; Katsuji Ikeda; Yoshihiro Hozumi; Kazuya Hiratsuka; Manabu Suhara; Takeshi Kawasato, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/217,592

(22) Filed: Dec. 21, 1998

(30) Foreign Application Priority Data

Dec. 22, 1997 (JP) .................................................. 9-364854

(51) Int. Cl.$^7$ .................................................. H01G 1/017
(52) U.S. Cl. ............................ 361/301.5; 361/301.1; 361/301.5; 361/303; 361/306.1; 361/313
(58) Field of Search ................................... 361/301.1–313

(56) References Cited

U.S. PATENT DOCUMENTS 3,849,708 * 11/1974 Leighton .............................. 317/260
4,345,298 * 8/1982 Grahame .............................. 361/273

* cited by examiner

*Primary Examiner*—Leo P. Picard
*Assistant Examiner*—Yean Hsi Chang
(74) *Attorney, Agent, or Firm*—Oblon, Spivak, McClelland, Maier & Neustadt, P.C.

(57) ABSTRACT

An electric double layer capacitor comprises a first electrode 31 comprising a belt-like electricity collecting material 31*a* having both surfaces on which electrode layers 31*b*, 31*c* are formed leaving belt-like portions in a side of the belt-like electricity collecting material 31*a* along its longitudinal direction, a second electrode 32 having the same structure as the first electrode 31, belt-like separators 33*a*, 33*b* to electrically insulate the first and second electrodes 31, 32, a post-like winding core 40 on which the first and second electrodes 31, 32 and the separators 33*a*, 33*b* are wound to thereby form a cylindrically wound element 50, a first electricity collecting plate 72 in contact with the belt-like portion 31*ax*, a second electricity collecting plate 62 in contact with the belt-like portion 31*ax*, wherein the belt-like portions 31*ax*, 32*ax* are located at opposing positions in the wound element 50, both ends of the winding core 40 are respectively in contact with the first and second electricity collecting plates 72, 62 to determine the relative positions in axial directions of the first and second electricity collecting plates 72, 62, and the electricity collecting plates 72, 62 are electrically insulated. In the capacitor, tab-like electricity collecting leads are not required, manufacture is easy to shorten a time for manufacturing, and the capacity density per volume is high.

16 Claims, 11 Drawing Sheets

ELECTRIC DOUBLE LAYER CAPACITOR

The present invention relates to an electric double layer capacitor. In particular, it relates to an electric double layer capacitor having wound or rolled electrodes.

Recently, an electric double layer capacitor having a large capacity and a high output, which aims at being mounted on a vehicle and is applicable to a driving power source for driving the vehicle, has been noted and developed.

As a structure for a large-sized electric double layer capacitor suitable for discharging a heavy current, such one having a cylindrical structure as shown in FIG. 12 has been used. Namely, a pair of belt-like electrodes, specifically, a belt-like positive electrode 2 and a belt-like negative electrode 3 each comprising a metallic current collecting material on both sides of which electrode layers composed mainly of an activated carbon are formed, are rolled by interposing therebetween belt-like separators 4, 4' to thereby form a cylindrically wound element. The wound element is housed in a bottomed cylindrical metallic casing 5. After an electrolyte is filled in the casing 5, current collecting leads 6, 6' are connected respectively to the positive electrode 2 and the negative electrode 3, and the current collecting leads drawn from the electrodes 2, 3 are respectively connected to electrode terminals 9, 9' which are provided on an electrically insulating opening sealing cover 8 fitted to the metallic casing 5.

The conventional electric double layer capacitor had disadvantages as follows. Processings for the current collecting leads were troublesome and time for manufacturing was elongated. Further, an additional space was necessary to house the current collecting leads in the casing, which inevitably caused a small-sized wound element and thus density of the capacity of the capacitor per volume of casing was lowered.

It is an object of the present invention to provide an electric double layer capacitor having an increased density of capacity per volume.

In order to accomplish the above-mentioned object, the present invention is to provide an electric double layer capacitor as shown mainly in FIGS. 1 and 8(a) and (b). Namely, the electric double layer capacitor comprises a first electrode 31 comprising a belt-like electricity collecting material 31a having at least one surface on which an electrode layer 31b (31c) is formed leaving a belt-like portion 31ax in a side of the belt-like electricity collecting material 31a along its longitudinal direction; a second electrode 32 comprising a belt-like electricity collecting material 32a having at least one surface on which an electrode layer 32b (32c) is formed leaving a belt-like portion 32ax in a side of the belt-like electricity collecting material 32a along its longitudinal direction; belt-like separators 33a, 33b interposed between the first electrode 31 and the second electrode 32 to electrically insulate them; a post-like winding core 40 having both ends, on which the first electrode 31, the second electrode 32 and the separators 33a, 33b are wound to thereby form a cylindrically wound element 50; a first electricity collecting plate 72 in contact with the belt-like portion 31ax of the first electrode 31 to collect electricity, and a second electricity collecting plate 62 (73 in FIG. 5) in contact with the belt-like portion 32ax of the second electrode 32 to collect electricity, wherein the belt-like portion 31ax of the first electrode 31 and the belt-like portion 32ax of the second electrode 32 are respectively at opposing positions in the cylindrically wound element 50; the both ends of the winding core 40 are respectively in direct or indirect contact with the first electricity collecting plate 72 and the second electricity collecting plate 62 (73 in FIGS. 5(a) and (b)) to determine the relative positions in axial directions of the first electricity collecting plate 72 and the second electricity collecting plate 62 (73 in FIGS. 5(a) and (b)), and the first electricity collecting plate 72 and the second electricity collecting plate 62 (73 in FIG. 5) are electrically insulated.

The second electricity collecting plate may be constituted by a bottom plate 62 in the casing (FIG. 1) or may be the electricity collecting plate 73 which is provided independently (FIGS. 5(a) and (b)). With respect to the contact between the electricity collecting plate and the belt-like portion, it is not always necessary to crush the belt-like portion but an elastic contact may be employed. Further, when the electricity collecting plate is provided with needle-like projections the belt-like portion may be in contact with the projections. The terms "direct" or "indirect" mean that a spacer is interposed between the electricity collecting plate and the belt-like portion to effect an indirect contact. For insulation, the winding core may be provided with an electrically insulating member in its axial direction or a spacer having an insulating property may be interposed therebetween.

With such arrangement, the belt-like portions of the first and second electrodes are positioned in a wound form at opposing ends in the cylindrically wound element. Since the first and second electricity collecting plates are respectively in contact with the belt-like portions of the first and second electrodes to collect electricity, tab-like electricity collecting leads are not required and the belt-like portions themselves act as electricity collecting leads. This structure makes it easy to manufacture, and further, time for manufacturing can be shortened. Further, since a space for receiving such tab-like electricity collecting leads is not required, an electric double layer capacitor having a high capacity density per volume can be provided.

Use of the winding core determines the relative positions of the first and second electricity collecting plates in their axial directions and sets the distance of the two plates in a desired value. Further, the winding core eliminates a danger that the two electricity collecting plates come to close or separate from each other due to vibrations during the use of the capacitor or the generation of gas inside the capacitor. Further, it maintains good contact between the belt-like portion and the electricity collecting plate.

The first electricity collecting plate 72 and the second electricity collecting plate 62 may respectively be in forcible contact with the belt-like portion 31ax of the first electrode and the belt-like portion 32ax of the second electrode. Alternatively, the belt-like portion 31ax of the first electrode and the belt-like portion 32ax of the second electrode may be crushed toward an axial direction of the post-like winding core 40 so that they are bent inwardly.

The term "forcible contact" means that the contact between the belt-like portions and the electricity collecting plates is performed by pressing them with a predetermined pressure for example. There are several ways of crushing the belt-like portions 31ax, 32ax. They may previously be crushed toward the axial direction, or the electricity collecting plates may be pressed to the belt-like portions as a result of which the belt-like portions are crushed, or slits may previously be formed in the belt-like portions so as to be easily crushed. The formation of slits is advantageous when the electricity collecting plates have a certain thickness so that it can not be expected to crush sufficiently the belt-like portions by only pressing the electricity collecting plates.

With such construction, when the first and second electricity collecting plates are respectively brought to forcible contact with the belt-like portions of the first and second electrodes, a variation of pressure by the winding core is suppressed to thereby minimize a variation of electric resistance at the forcible contact portions.

In an aspect of the present invention, the electric double layer capacitor is provided with a cylindrical casing 60 to house the wound element 50 wherein the casing 60 has a bottom cover 62 at its one end and an opening sealing cover 63 at its other end, the wound element 50 is between the bottom cover 62 and the opening sealing cover 63, and the wound element 50 is fixed in the casing by means of the winding core 40.

The bottom cover 62 may be formed integrally with the cylindrically formed casing wherein the portion corresponding to the bottom cover 62 is formed by deep drawing for example. Further, the winding core 40 may be fixed directly to the bottom cover 62 to thereby fix the wound element 50 (FIG. 2 and FIG. 4). Further, the winding core 40 is first fixed to the electricity collecting plate 73, and then, the plate 73 is fixed to the casing 60 to thereby fix the wound element 50 (FIG. 5).

Figure 1:
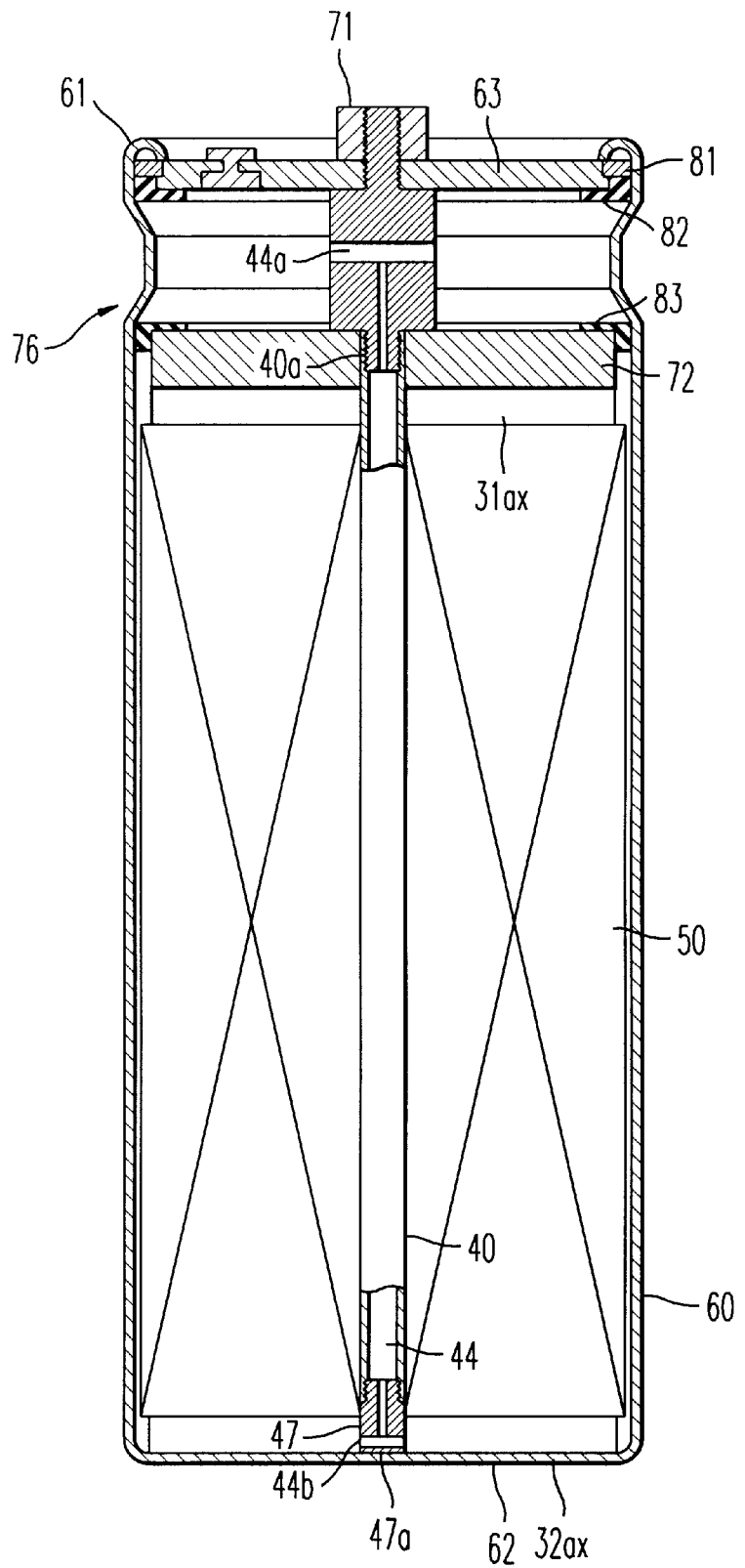
FIG. 1 is a schematically shown longitudinal cross-sectional view of an embodiment of the electric double layer capacitor according to the present invention.
Figure 5A:
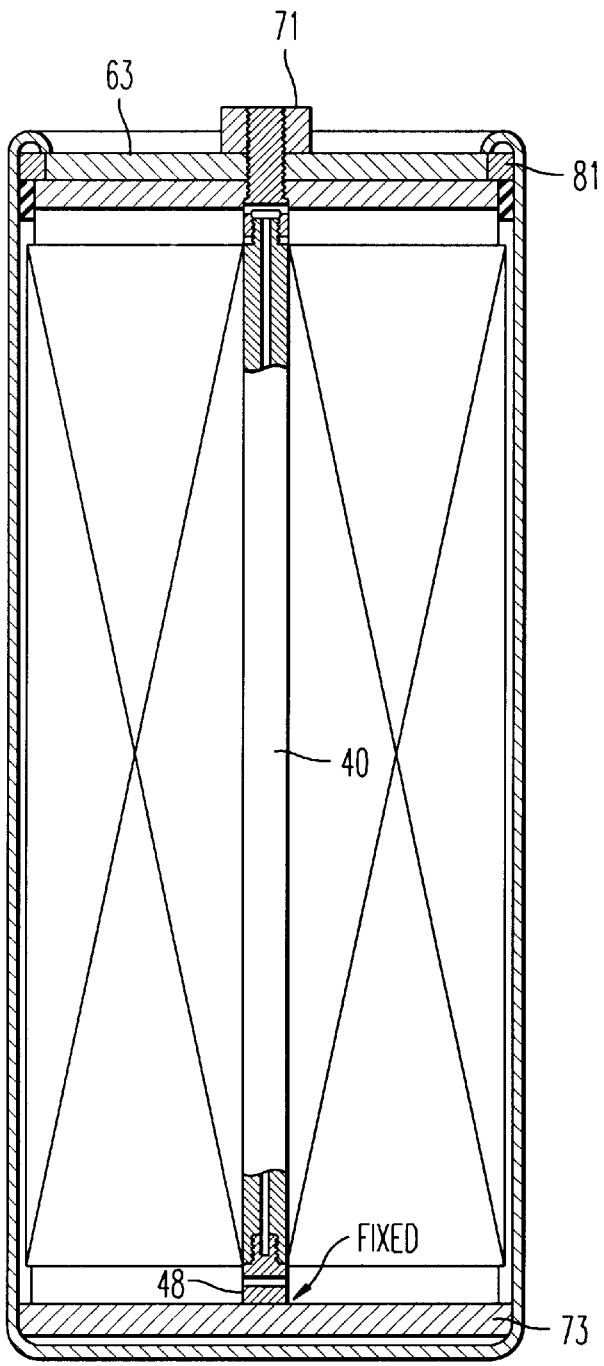
Figure 5B:
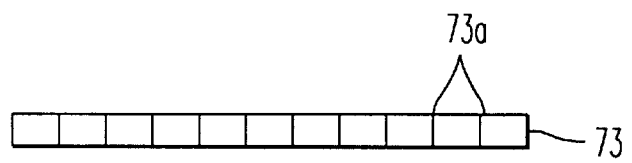
Figure 6:
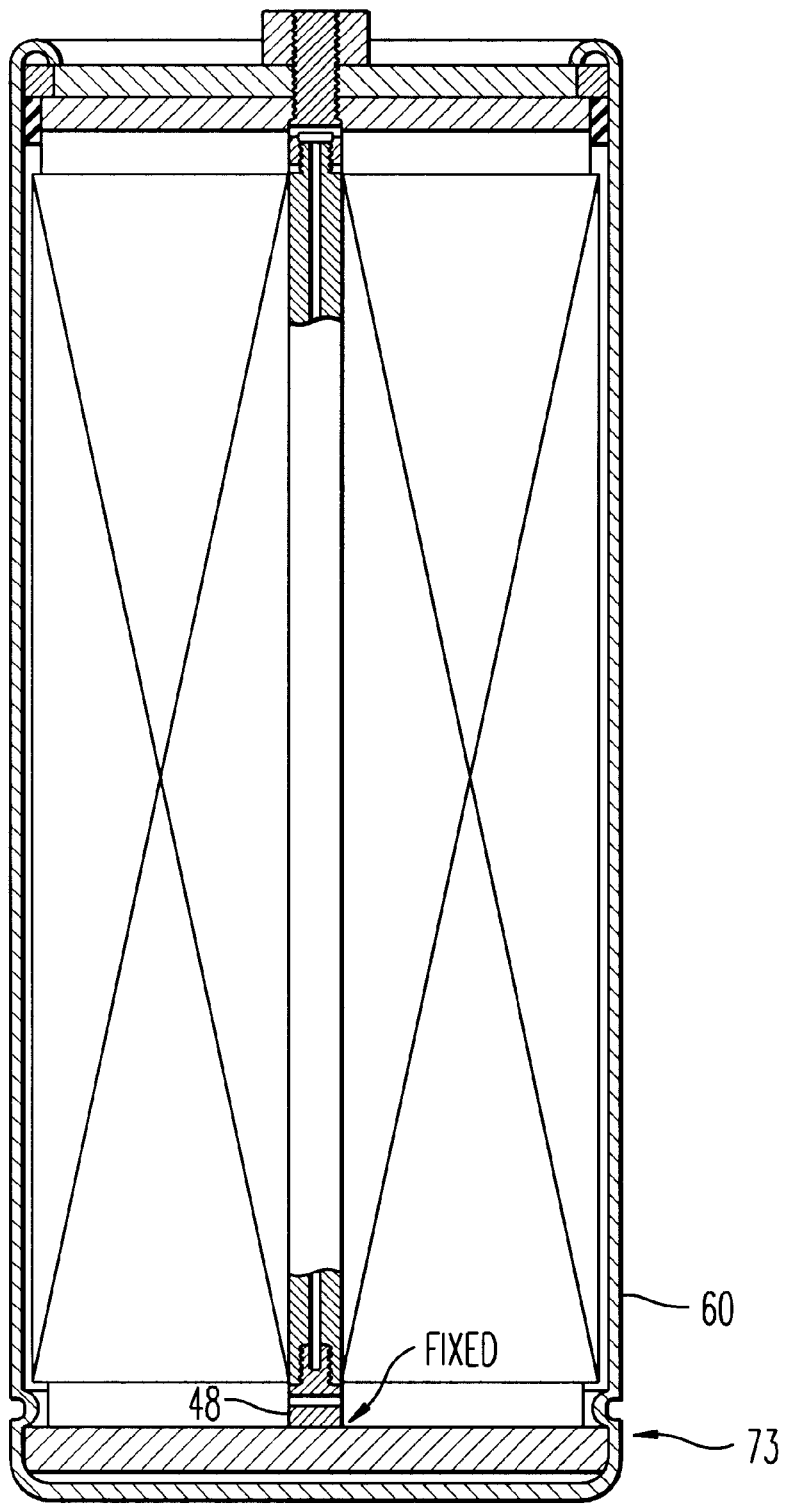
Figure 7:
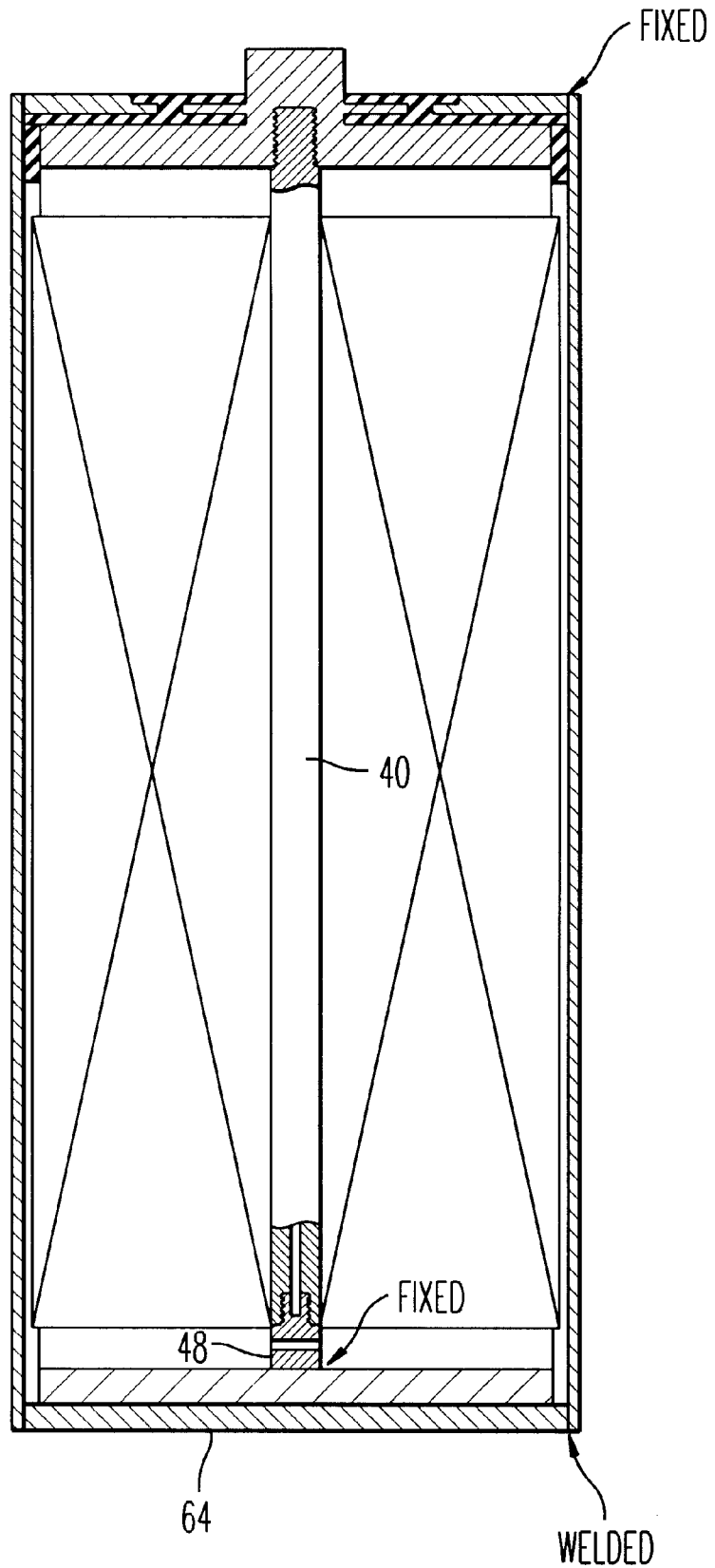
Figure 8:
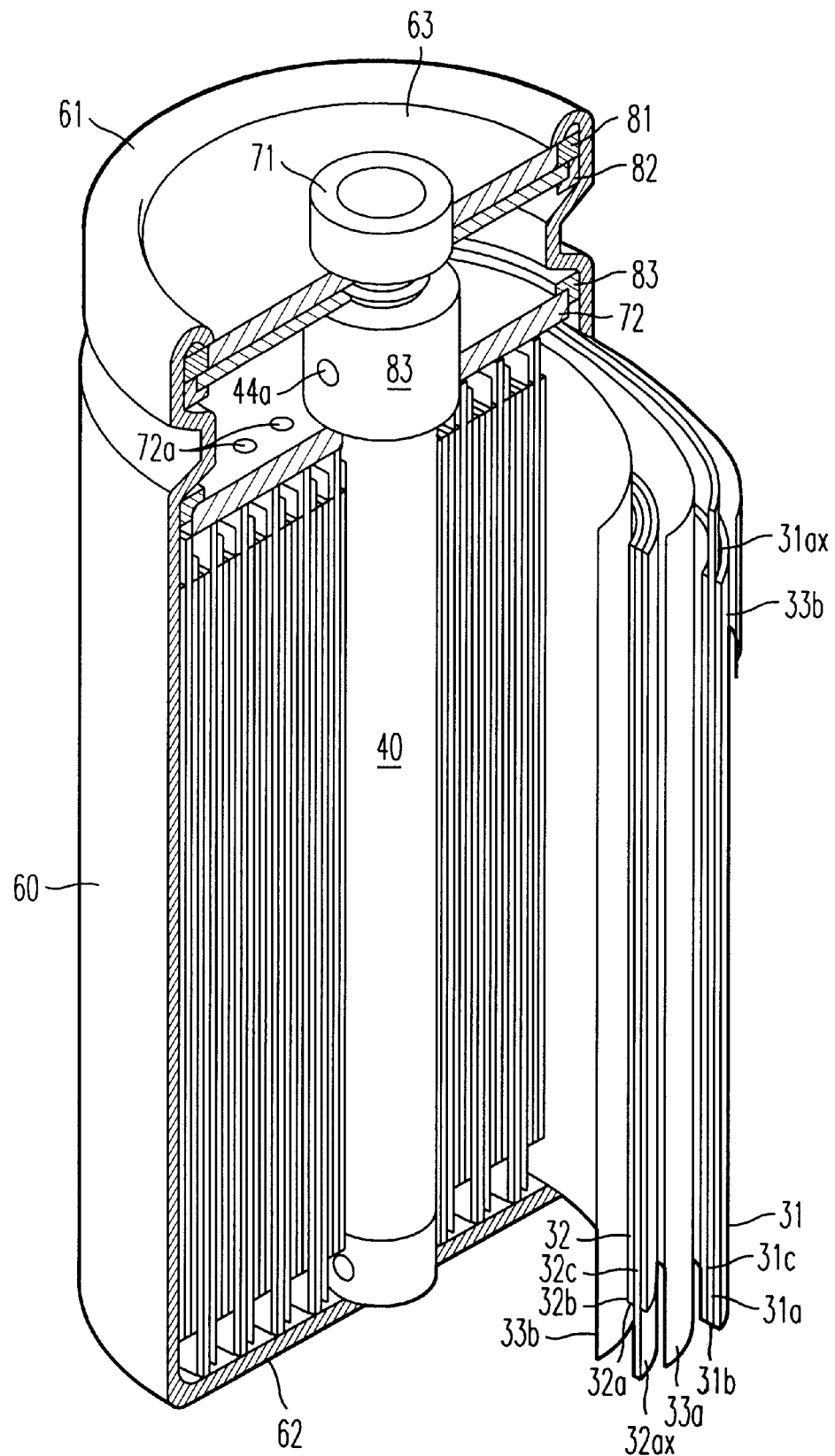
Figure 9:
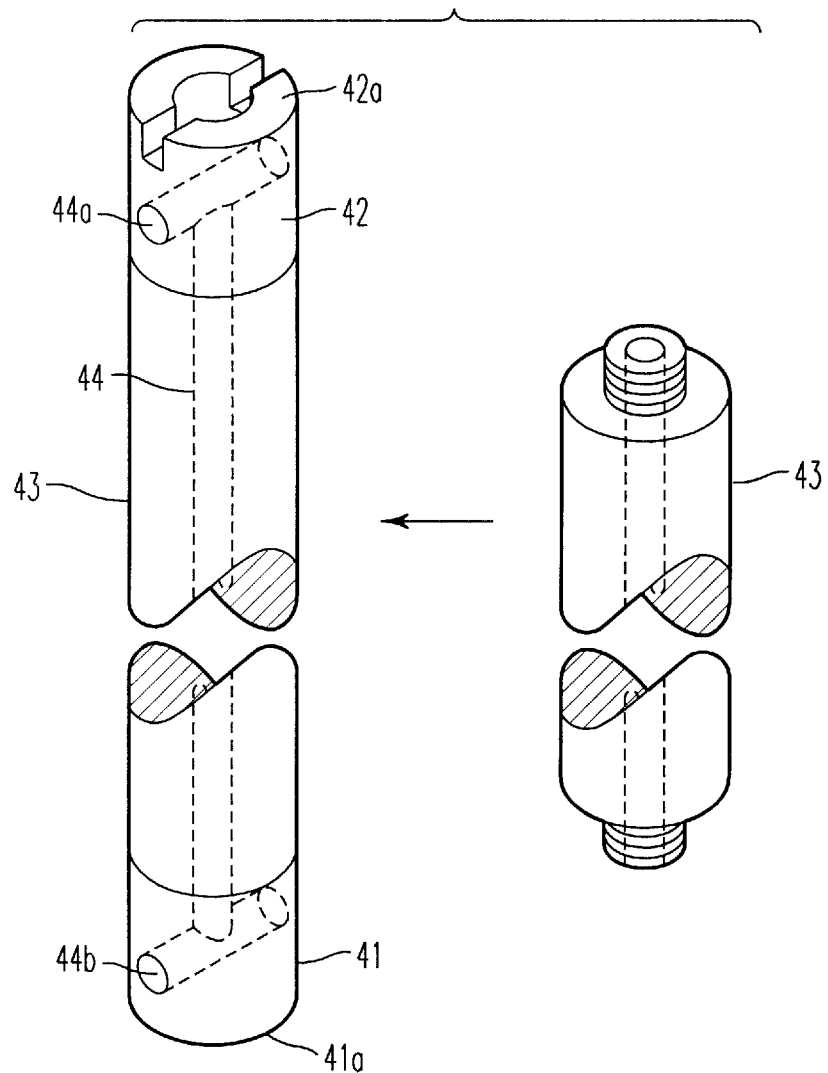
Figure 11:
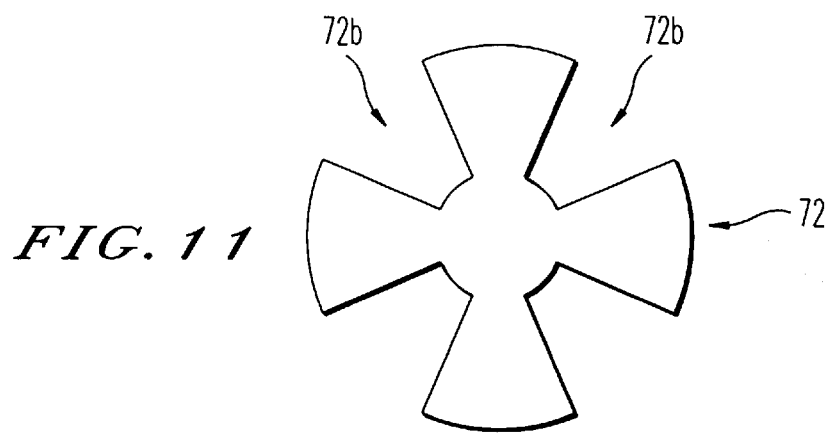
Figure 10A:
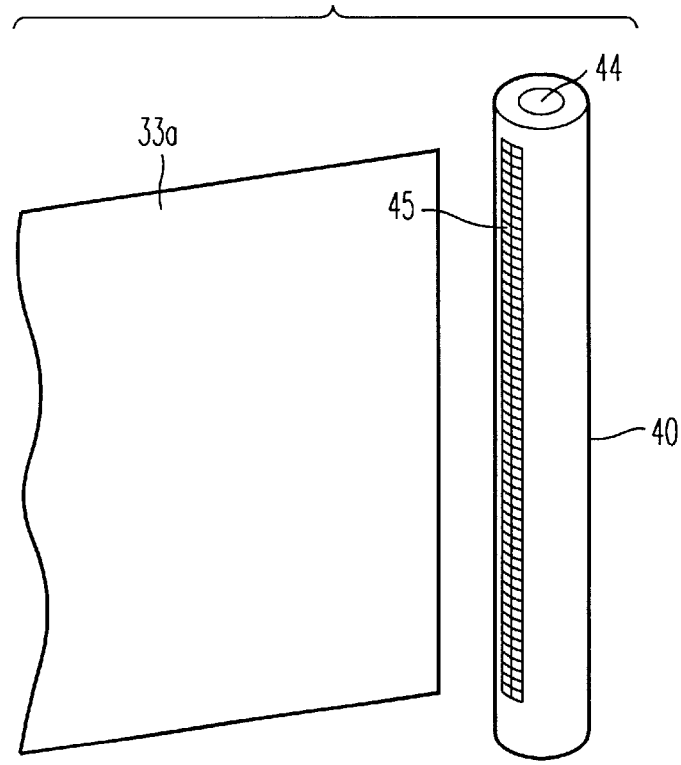
Figure 10B:
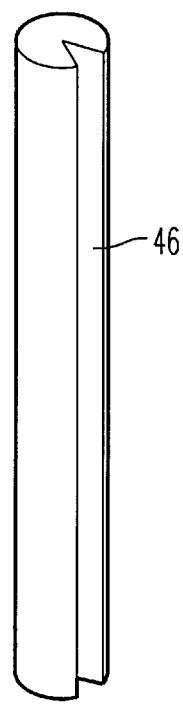
Figure 12:
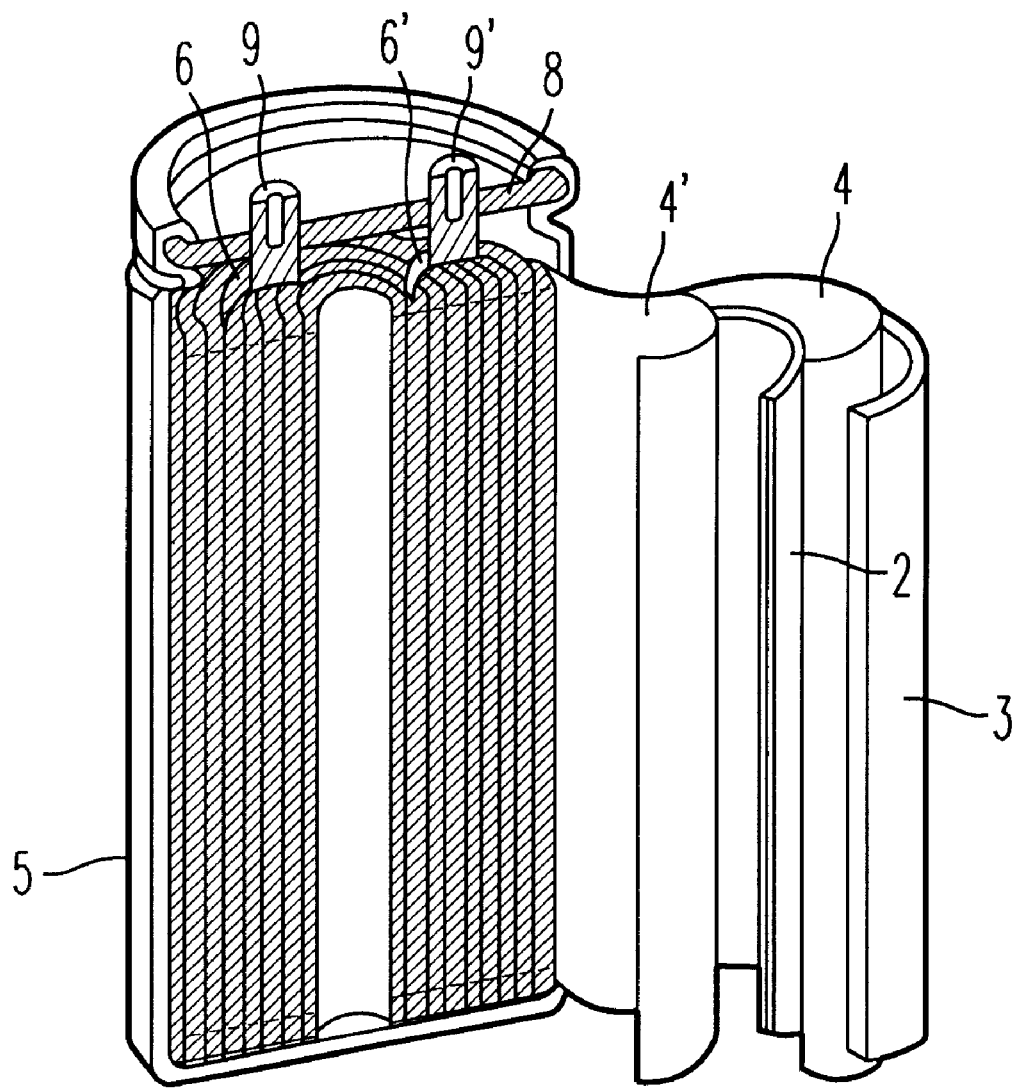

FIGS. 5(*a*) and (*b*) show a schematic longitudinal cross-sectional view of a fifth embodiment of the electric double layer capacitor according to the present invention and an end view of one embodiment of a lower electricity collecting plate, respectively;

FIG. 6 is a schematically shown longitudinal cross-sectional view of a sixth embodiment of the electric double layer capacitor according to the present invention;

FIG. 7 is a schematically shown longitudinal cross-sectional view of a seventh embodiment of the electric double layer capacitor according to the present invention;

FIG. 8 is a perspective view partly cross-sectioned showing in detail the structure of the electric double layer capacitor shown in FIG. 1;

FIG. 9 is a perspective view showing an embodiment of a winding core preferably used in the present invention;

FIGS. 10*a* and 10*b* are perspective views showing an example of winding a separator around the winding core wherein a central bore and a slit are formed in the winding core; and FIG. 11 is a top view of an embodiment of an upper electricity collecting plate;

FIG. 12 is a perspective view partly cross-sectioned showing a conventional electric double layer capacitor.

Preferred embodiments of the electric double layer capacitor of the present invention will be described with reference to the drawings wherein the same reference numerals indicate the same or corresponding parts and description of these parts is omitted. In the following description, terms expressing a vertical relation, such as an upper portion, a lower portion, an upper edge, a lower edge or the like, are used conveniently based on a positional relation shown in the Figures, and these terms does not imply that the electric double layer capacitor of the present invention does not have to placed in lateral or inverted in actual assembly works or actual use.

FIG. 1 is a longitudinal cross-sectional view of the electric double layer capacitor according to the first embodiment of the present invention and FIG. 8 is a perspective view showing the detail of the first embodiment. The particulars of the first embodiment will be described with reference to FIGS. 1 and 8.

A wound element 50 is formed by winding or rolling a positive electrode 31 as a first electrode and a negative electrode 32 as a second electrode by interposing belt-like separators 33*a*, 33*b* in an overlapping state (FIG. 8). The positive electrode 31 has such a construction that an electrode layer 31*b* is formed on a surface of a belt-like electricity collecting material 31*a* and an electrode layer 31*c* is on the other surface wherein a belt-like portion 31*ax* is left in each surface at portions along an upper side which is a side along a longitudinal direction of the belt-like material. Similarly, the negative electrode 32 has such a construction that an electrode layer 31*b* and an electrode layer 31*c* are formed respectively in opposing surfaces of a belt-like electricity collecting material 32*a* wherein a belt-like portion 32*ax* is left in each surface at a position along a lower side which is a side in the belt-like material 32*a* along its longitudinal direction. With respect to the positive electrode 31, the electrode layers 31*b*, 31*c* have respectively substantially the same width and they are formed at corresponding positions in the opposing sides of the belt-like electricity collecting material 31*a*. The above-mentioned arrangement is also applicable to the negative electrode 32.

The width of each of the electrode layers 31*b*, 31*c* of the positive electrode 31 is substantially the same as the width of each of the electrode layers 32*b*, 32*c* of the negative electrode 32. The separators 33*a*, 33*b* have a slightly larger width than the electrode layers 31*b*, 31*c*, 32*b*, 32*c*, e.g., they have substantially the same width as the electrodes 31*a*, 32*a*. When the positive and negative electrodes 31, 32 and the separators 33*a*, 33*b* are overlaid to wind them, the electrode layer of the positive electrode and the electrode layer of the negative electrode are substantially in an overlapping relation with respect to their width directions; the centerline in a longitudinal direction of the separators 33*a*, 33*b* is substantially in an overlapping relation to the centerline in a longitudinal direction of the electrode layers 31*b*, 31*c*, 32*b*, 32*c*; and the belt-like portion 31*ax* of the positive electrode 31 and the belt-like portion 32*ax* of the negative electrode 32 are positioned at opposing sides with respect to the centerline in a width direction of the positive and negative electrode materials. In the wound assembly thus formed, the separators 33*a*, 33*b* completely cover the positive electrode layer and the negative electrode layer whereby these electrode layers can be electrically insulted in a cylindrically wound element.

Thus, the wound element is formed by winding laminated sheets comprising the separator 33*a*, the positive electrode 31, the separator 33*b* and the negative electrode 33 which are overlaid in this order. There is a winding core 40 at the center of the wound element 50. Practically, the wound element is formed by winding the laminated sheets so that the separator 33*a* is in the innermost periphery around the winding core 40. Further, the wound element 50 may be comprised of the winding core 40, the separator 33*a*, the negative electrode 32, the separator 33*b* and the positive electrode 31 which are overlaid in this order.

FIG. 8 shows a structure that a separator and the positive electrode are wound in this order in the innermost portion, and the positive electrode and a separator are wound in this order in the outermost portion. However, such a structure that the negative electrode and separator are positioned in the outermost portion may be used.

In other words, the basic structure of the wound element 50 is such that two belt-like electrodes, i.e., the positive electricity collecting material 31a and the negative electricity collecting material 32a, are overlaid with their edge portions shifted in a vertical direction while the electrode layers of the positive and negative electrodes are correctly overlaid; separators 33a, 33b are alternately put in the electrodes, and the overlaid assembly is wound in a cylindrical form. In this case, the positive electrode has in its upper portion the belt-like portion 31ax as a portion to be crushed, and the negative electrode has in its lower portion the belt-like portion 32ax as a portion to be crushed.

The wound element 50 is generally in a cylindrical form, and an assembly comprising the winding core and the wound element 50 is housed in a bottomed cylindrical casing 60.

A positive electricity collecting plate 72 having a circular plate form as a first electricity collecting plate which is in contact with the belt-like portion 31ax of the positive electrode 31 to collect electricity, is fixed in substantially perpendicular to the winding core 40 wherein a side surface of the plate 72 is in contact with an upper end 40a of the winding core 40.

The belt-like portion 32ax of the negative electrode 32 is in contact with an inner side of a bottom portion 62 of a bottomed cylindrical casing of metal 60 in an assembled state. The bottom portion 62 constitutes a negative electricity collecting plate as a second electricity collecting plate in the first embodiment. A lower end 47a which opposes the upper end 40a of the winding core 40 is in contact with an inner side of the bottom portion 62.

The belt-like portions 31ax, 32ax as portions to be crushed which are in an upper portion or a lower portion are pressed to the electricity collecting plate 72 and the casing 60 to be crushed in a predetermined amount so as to provide electrically contacting. In this construction, a positive terminal can be an upper portion of the opening sealing cover 63 and the negative terminal can be the casing 60 whereby a serial connection of electric double layer capacitors becomes possible.

The winding core 40 is a generally post-like cylindrical member having the upper end 40a and an electrically insulating member 47 at its lower portion. The winding core has a major portion made of metal except the insulating member 47 at its lower portion. In FIG. 8, a lower end portion of the post-like member is a lower end 47a and an upper end portion is the upper end 40a.

As described above, the belt-like portion 31ax of the positive electrode 31 and the belt-like portion 32ax of the negative electrode 32 are wound so as to be at opposing positions at respective ends of the cylindrically wound element 50 (upper and lower ends in FIG. 8).

Further, in the assembly, the both end portions 40a, 47a of the winding core 40 are respectively in contact with the positive electricity collecting plate 72 and the bottom portion 62 which functions as a negative collecting plate. Accordingly, the winding core 40 functions to determine relative positions in axial directions of the positive electricity collecting plate 72 and the negative electricity collecting plate 62.

Further, since the winding core 40 is provided with the insulating member 47 at its lower portion, there is no danger that the positive and negative electricity collecting plates 72, 62 are electrically conductive in the winding core 40.

A post-like positive terminal member 74 is provided on an upper end of the winding core 40 and at an opposite side of the positive electricity collecting plate 72 so that its central axial line is in agreement with the central axial line of the winding core 40. The positive electricity collecting plate 72 is provided with an opening into which the winding core 40 is inserted. The opening has a stepped portion at an intermediate of the opening so that the upper end 40a of the winding core 40 is rest on the stepped portion. A male screw is formed in a lower portion of the positive terminal member 74, and a female screw complementary to the male screw is formed in an upper portion of the winding core 40. When the male screw is inserted into the opening of the positive electricity collecting plate 72 to engage with the female screw, the winding core 40 can be assembled in one piece with the positive electricity collecting plate 72.

An opening sealing cover 63 having a circular plate form is placed in an upper portion of the positive terminal member 74, and a positive outer terminal 71 is provided on the positive terminal member 74 by interposing the opening sealing cover 63. A male screw and a female screw which are in a complementary relation are formed in the positive terminal member 74 and the positive outer terminal 71 respectively. By engaging the both screws, the positive terminal member 74 and the positive outer terminal 71 are secured by interposing the opening sealing cover 63 therebetween.

An assembly including the winding core 40, the wound element 50, the positive electricity collecting plate 72, the positive terminal member 74, the opening sealing cover 63 and the positive outer terminal 71 is received in the metallic casing 60. In this case, the outer diameter of the positive electricity collecting plate 72 is formed slightly smaller than the inner diameter of the casing 60 so that a ringed packing 83 having an L-shape in cross-section, made of an insulting material, whose thickness is as half as a space formed between the positive electricity collecting plate 72 and the casing 60, is interposed to electrically insulting the both members.

Further, the outer diameter of the opening sealing cover 63 having a circular plate form is formed slightly smaller than the inner diameter of the casing 60 so that a ringed packing 82 having an L-shape in cross-section, made of an insulating material, whose thickness is as half as a space formed between the opening sealing cover is 63 and the casing 60, is interposed to electrically insulate the both members. An O-ring 81 having a rectangular shape in cross-section is set as a sealing member in an upper portion of the packing 82 and an inner portion of the casing 60. An upper edge 61 of the casing, which opposes the bottom portion 62 of the cylindrical casing 60, is bent inwardly toward the opening sealing cover 63 so as to cover the O-ring 81 as a sealing member whereby sealing is effected between an edge portion of the casing 60 and the O-ring 81. Further, the bent upper edge 61 of the casing 60 functions to depress the opening sealing cover 63 by means of the O-ring 81, and the wound element 50 is clamped between the opening sealing cover 63 and the bottom portion 62 with the aid of the positive terminal member 74 and the positive electricity collecting plate 72 whereby the wound element 50 is fixed in the casing.

A neck portion is formed in the casing 60 at a position slightly above the electricity collecting plate 72 by drawing an outer circumference of the casing 60 inwardly so that the electricity collecting plate 72 is pushed toward the bottom portion 62 through the packing 83. The formation of the neck portion 76 urges the electricity collecting plate 72 toward the bottom portion 62 with the result that the wound element 50 is clamped between the electricity collecting plate 72 and the bottom portion 62, and at the same time, the belt-like portions 31ax, 32ax are compressed. Thus, the electricity collecting plate or the bottom plate as an electricity collecting plate is in forcible contact with an end plane of the wound element 50. In this case, the winding core 40 functions as a stopper for the electricity collecting plate 72 and the bottom plate 62 in their axial directions, and an amount of forcible contact of the wound element 50 can be kept constant. Accordingly, an amount to be crushed in the belt-like portions 31ax, 32ax can be determined to be a desired value, and a contact pressure between the wound element 50 and the electricity collecting plate 72 or the bottom plate 62 can be maintained constant, whereby a change of electric resistance can be prevented when the electric double layer capacitor is used.

The belt-like portions 31ax and 32ax may be compressed in an axial direction of the wound element 50 before the wound element 50 is brought to contact with the electricity collecting plate 72 or the bottom plate 62 to thereby form crushed portions for collecting electricity at both end portions of the wound element 50. By forcibly contacting the crushed portion to the electricity collecting plate, an electric current can be taken. Alternatively, the crushed portions may be formed during assembling the electricity collecting plate 72 or the bottom plate 62 with the result that the belt-like portions are crushed.

The above-mentioned technique provides a so-called leadless (tables) structure in comparison with the conventional technique having lead wires. Accordingly, a space which is occupied by the lead wires can be saved and the occupation rate inside the capacitor can be improved. Further, since the electricity collecting plate having a relatively large surface area is used, an electric internal resistance can be low in collecting electricity. Accordingly, a high output of power is obtainable.

The formation of the neck portion 76 pushes the electricity collecting plate 72 down whereby the wound element 50 is clamped between the plate 72 and the bottom portion 62 to fix the wound element 50 in the casing. A drawing operation to the neck portion 76 is generally conducted before the upper portion of the casing is bent to cover the opening sealing cover 63.

Then, an electrolyte is introduced into the thus formed assembly. In the capacitor having a cylindrically formed electrodes, the electrolyte is normally introduced through an injection hole formed in the opening sealing cover. In order to make an injecting operation easy (to assure the introduction of a sufficient amount of electrolyte and shortening an injection time), an opening (openings) or a cut portion (portions) may be formed in the electricity collecting plate 72 so that the electrolyte is fed without passing through the crushed portion. For example, the electricity collecting plate 72 is formed to have a cross shape by forming 4 cut portions at positions perpendicular to each other.

The winding core 40 is provided with a central bore 44 and lateral bores 44a, 44b which are respectively formed in upper and lower portions of the winding core, the upper and lower portions being projected from the major portion of the wound element 50, and which are communicated with the central bore 44. The electrolyte injected into the casing through the injection hole is passed through an opening (such as 72(a) shown in FIG. 8) or a cut portion (such as 72(b) shown in FIG. 11) in the electricity collecting plate 72 to fill the wound element 50. The electrolyte flows through the lower lateral bore 44b, the central bore 44 and the upper lateral bore 44a upwardly or it flows through the upper lateral bore 44a, the central 44 and the lower lateral bore 44 downwardly thereby fill the wound element 50. An excessive amount of the electrolyte escapes through the opening or the cut portion formed in the electricity collecting plate 72, and hence the wound element 50 is sufficiently impregnated with the electrolyte.

In this embodiment, the electrolyte is introduced after the wound 50 is received in the casing. However, the wound element 50 in which the electrolyte is previously impregnated may be received in the casing.

Figure 2:
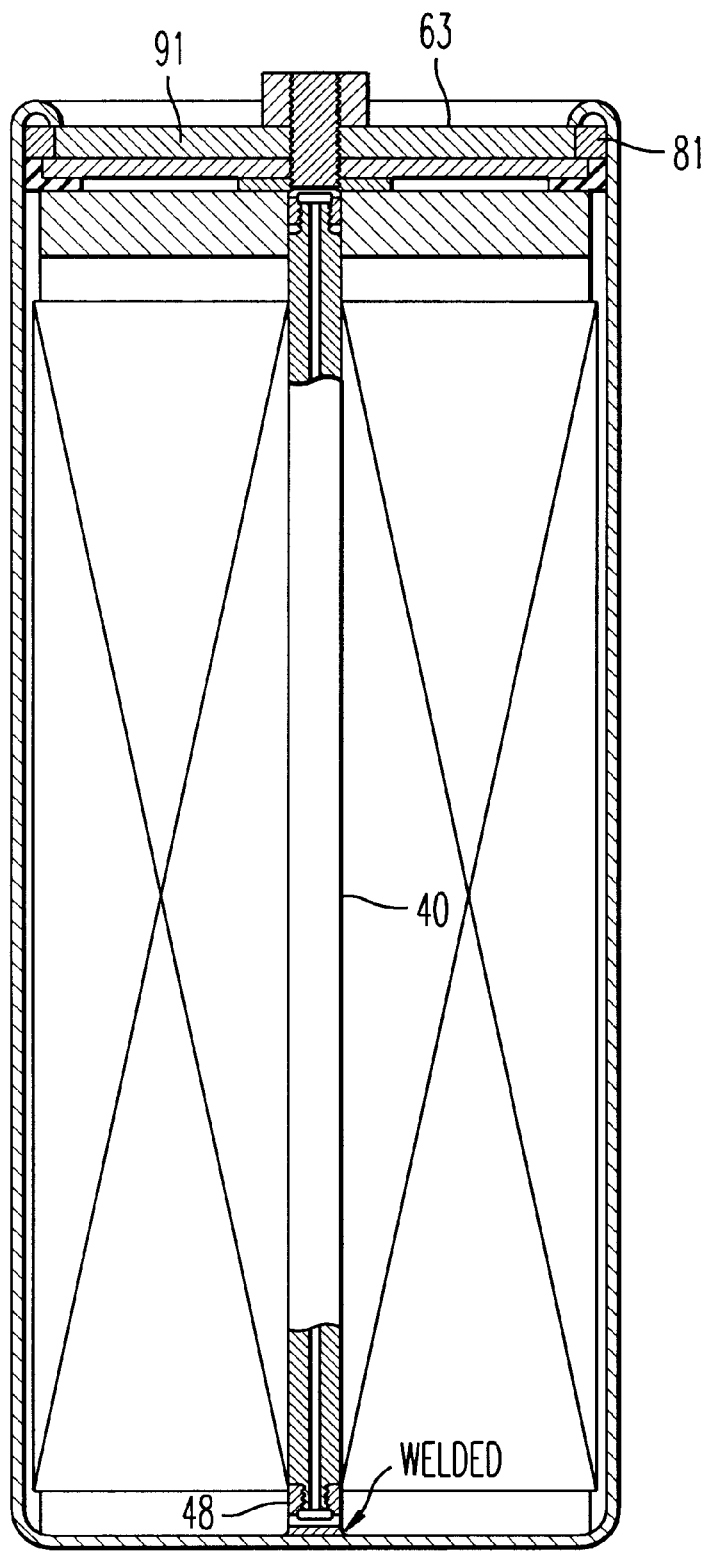
FIG. 2 is a schematically shown longitudinal cross-sectional view of a second embodiment of the electric double layer capacitor according to the present invention.

The electric double layer capacitor according to a second embodiment of the present invention will be described with reference to FIG. 2. The electric double layer capacitor of the second embodiment is different from that of the first embodiment in the point that how the electrode assembly is brought to contact with the electricity collecting plate.

There are two main different points from the first embodiment. The first point is that the neck portion 76 is not formed in the casing 60, and a thin positive terminal member 91 is interposed between the electricity collecting plate 72 and the opening sealing cover 63 around the axial center line of the winding core 40. The second point is that a winding core receptor 48 is fixed at the center of the bottom portion 62 of the casing 60 by means of, for example, welding, bonding or the like. A female screw is formed in the winding core receptor 48 and a male screw which is in a complementary relation to the female screw, is formed in a lower end of the winding core 40.

The structure according to the second embodiment can omit a space in a upper portion which is required to form the neck portion. In consideration of the omission of the space as well as a tabless structure, it is possible to increase the capacity density per volume of the electric double layer capacitor. The sealing effect of the casing 60 is assured by means of the bent portion formed at an upper edge of the casing and the packing 81 having a rectangular shape in cross section.

The opening sealing cover 63, the winding core 40 and the wound element 50 are assembled as an assembly having a sufficient rigidity wherein the winding core 40 is fixed to the winding core receptor 48. Accordingly, the assembly can be firmly connected to the casing without forming the neck portion as a fixing means. The omission of the neck portion makes the manufacture easy and simplifies an equipment for production.

Further, since the winding core is fastened with screw to the winding core receptor 48 as a member fixed to the bottom portion of the casing, a contact pressure between the electricity collecting plate 72 and the wound element 50 and between the wound element 50 and the bottom portion 62 can be kept and stabilized. Also, it improves an anti-vibration property.

Figure 3:
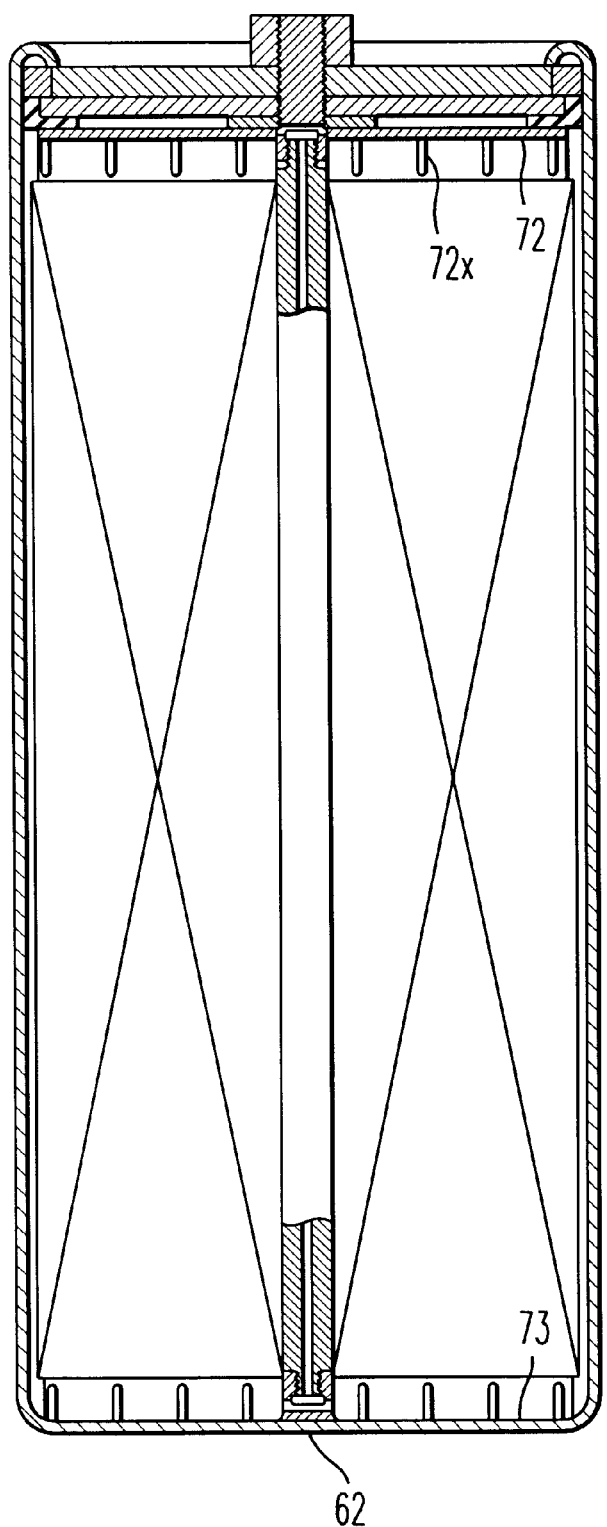
FIG. 3 is a schematically shown longitudinal cross-sectional view of a third embodiment of the electric double layer capacitor according to the present invention.

A third embodiment of the present invention will be described with reference to FIG. 3.

In the third embodiment, there are two main different points from the second embodiment. The first point is that the bottom portion 62 of the casing 60 is not used as the electricity collecting plate of negative electrode and an electricity collecting plate 73 is provided along the bottom portion 62. The second point is that a number of needle-like projections 72x are provided in the electricity collecting plates 72, 73 at sides in contact with the wound element 50. The length of the needle-like projections 72x in the electricity collecting plate 72 is shorter than the width of the belt-like portion 31*ax*, for instance, is as half as the width of it. Further, the electricity collecting plate 73 is provided with a plurality of openings.

When the needle-like projections are pressed to the belt-like portion 31*ax* of the wound element 50, the contact of the needle-like projections in their longitudinal direction can be expected whereby a sufficient contact area can be maintained. Further, the needle-like projections can be cut into the crushed portion whereby a decrease of contacting area can be avoided even when the contacting pressure is weakened. However, the needle-like projections should have a length not to bring them into contact with the opposing electrode due to excessive cutting. The same care should be taken in a case that the needle-like projections are formed in the electricity collecting plate 73 on the side of negative electrode. An insulating portion is provided in an intermediate portion of the winding core 40 in the same manner as the second embodiment. However, when the winding core receptor 48 made of an insulating material is to be attached to the bottom portion 62, it is unnecessary to provide an insulating portion in the intermediate portion of the winding core 40.

The needle-like projections 72*x* may be pushed under a pressure to the wound element 50 or they may be simply pushed without applying a substantial pressure.

An example of the structure of the winding core will be described with reference to FIG. 9. The winding core 40 is a generally cylindrical post-like member composed of a winding core lower portion 41, a winding core upper portion 42 and a winding core intermediate portion 43 between the upper and lower portions 41, 42. In FIG. 9, a lower end portion of the post-like member (a lower end of the winding core lower portion 41) is a lower edge 41*b* and an upper end portion (an upper end of the winding core upper portion 42) is an upper edge 42*a*.

The winding core lower portion 41 and the winding core upper portion 42 are both made of metal such as aluminum, and the winding core intermediate portion 43 is of an insulating material such as plastic. These members are firmly connected by means of screw, welding or the like. FIG. 9 shows a case that male screw is formed in the intermediate portion 43 and female screws are formed in the lower and upper portions 41, 42. The intermediate portion of insulating material prevents the electric conduction between the electricity collecting plate for the negative electrode which is in contact with the lower portion 41 and the electricity collecting plate for the positive electrode which is in contact with the upper portion 42. Further, since the winding core 41 having a one-piece structure of the upper portion, the intermediate portion and the lower portion is provided with the central bore 44 and the lateral bores 44*a*, 44*b* as described before, the electrolyte can be filled in a shorter time.

The electricity collecting plate 73 is pushed to the bottom portion 62 with a pushing force provided by bending an upper edge of the casing 60 at the time of sealing the opening whereby a sufficient electrically conductive state of the negative electrode can be maintained.

Figure 4:
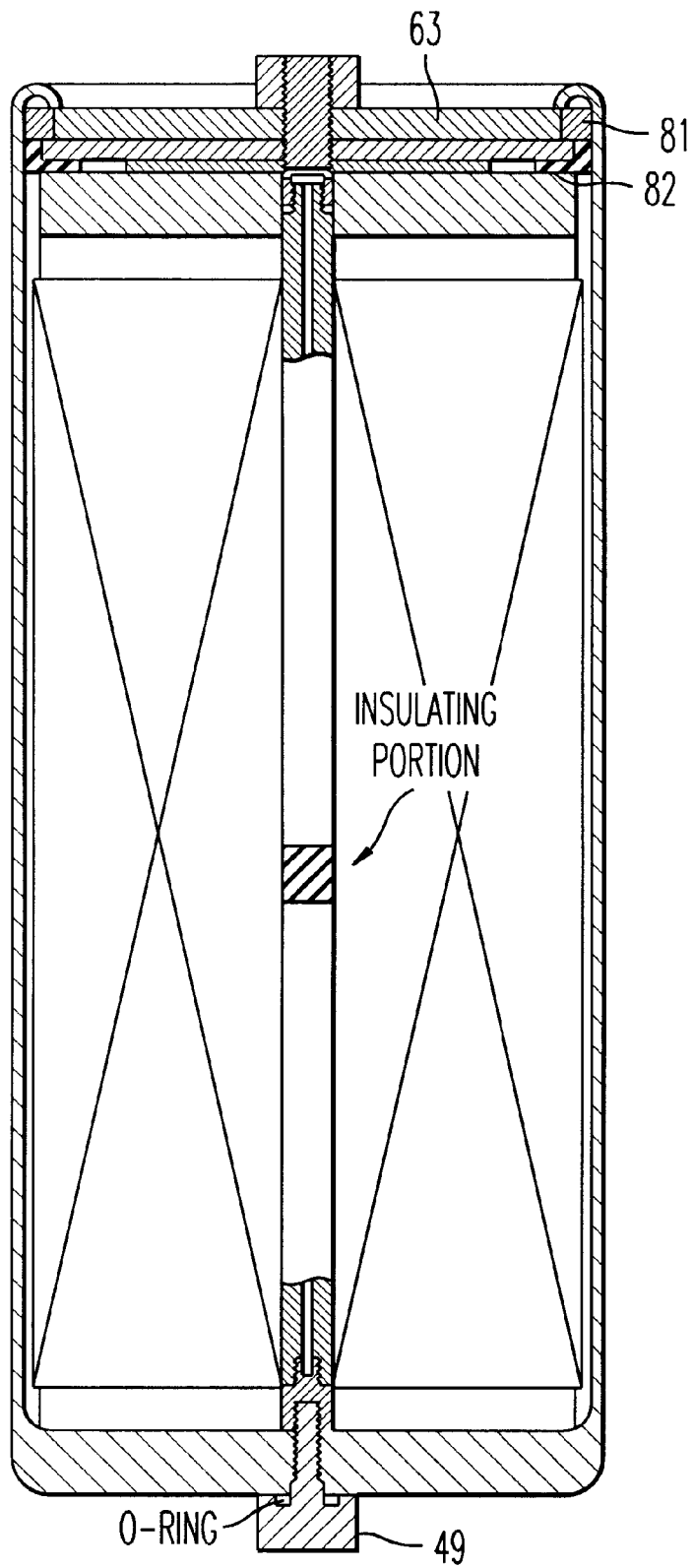
FIG. 4 is a schematically shown longitudinal cross-sectional view of a fourth embodiment of the electric double layer capacitor according to the present invention.

A fourth embodiment of the present invention will be described with reference to FIG. 4. The main different point from the second embodiment is as follows. An opening is formed around the center of the bottom portion 62 instead of welding the winding core receptor to the bottom portion 62 of the casing 60. A headed male screw member 49 is inserted in the opening. A female screw which is in a complementary relation to the male screw member 49 is formed in a lower portion of the winding core 40. The male screw member 49 is engaged with the female screw of the winding core 40 to thereby fix the winding core 40 to the casing 60. In this embodiment, the male screw member 49 may be used as a terminal for taking a current from a power source. By using the screw means for fixing, the winding core 40, hence, the wound element 50 can firmly be fixed in the casing 60. A sufficient sealing function should be provided between the male screw member 49 and the casing 60.

A fifth embodiment of the present invention will be described with reference to FIGS. 5(*a*) and (*b*). A major different point from the second embodiment is that the electricity collecting plate 72 is omitted and the opening sealing cover 63 is used as the electricity collecting plate. A lower face of the opening sealing cover 63, i.e., the face facing the inside of the casing 60 is formed of an electrically conductive material, and an upper face, i.e. the face facing the outside of the casing 60 is formed of an electrically insulating material. The positive electrode outer terminal and the winding core 40 clamps the opening sealing cover 63 which serves as an electric collecting plate.

Further, there is another different point. Namely, the bottom portion 62 of the casing 60 is not used for the electricity collecting plate for the negative electrode, and instead, an electricity collecting plate 73 is provided along the bottom portion 62. The electricity collecting plate 73 is a circular plate having a sufficient rigidity and has its outer diameter which is substantially the same as the inner diameter of an inner wall of the casing at a position near the bottom portion. The outer diameter portion of the plate may have a smooth surface or may have knurled lines 73*a* formed in a direction in parallel to the axial center line of the circular plate as shown in FIG. 5(*b*). It is preferable that the outer diameter is formed to be slightly smaller than the inner diameter of the inner wall of the casing at a position near the bottom portion. When the electricity collecting plate 73 having the above-mentioned structure is put into the casing 60, the portion having knurled lines 73*a* bites the inner wall portion of the casing whereby the electricity collecting plate 73 can sufficiently be fixed to the casing 60. When the electricity collecting plate 73 is formed to have a cross shape rather than a simply circular plate, preferred results can be obtained from the viewpoint of easiness of introducing the electrolyte and the security of the plate to the casing 60.

When the inner diameter of a side face of the casing 60 at a position near the bottom portion is formed slightly smaller than the outer diameter of the electricity collecting plate 73, and the inner diameter of the side face at a position apart from the bottom portion is formed slightly larger than the outer diameter of the electricity collecting plate 73, the assembling work of the electricity collecting plate 73 into the casing 60 is easy, and a strong connection of the both members is obtainable. Alternatively, the inner diameter of the casing 60 may be made constant and the electricity collecting plate 73 is put into the casing 60, and then, an outer circumferential portion of the casing 60 may be caulked to fix the electricity collecting plate 73.

The winding core 40 serves as a stopper which maintains the distance between the upper and lower electricity collecting plate constant wherein the upper end of the winding core 40 is in contact with the opening sealing cover 63 as the upper electricity collecting plate and the lower end is in contact with the electricity collecting plate 73.

In the above-mentioned structure, the omission of a space where the upper electricity collecting plate 72 is to be positioned improves the occupation rate of electrode. In the same manner as the foregoing embodiments, the injection hole for injecting the electrolyte is formed in the opening sealing cover 63. The injection hole is sealed with a plastic material or an adhesive agent after the injection of the electrolyte. Further, the winding core 40 is provided with the central bore and the lateral bores to provide passages for the electrolyte in the same manner as the other embodiments.

The electricity collecting plate 73 having a sufficient rigidity located in the bottom portion can suffer a pushing force given through the wound element 50. Since the pushing force is transmitted through the electricity collecting plate 73 to the side face of the casing 60, the swelling of the bottom portion of the casing 60 can be prevented even when for instance, an internal pressure is increased due to the generation of gas, unlike a case that the bottom portion 62 of the casing receives directly the pushing force. As a result, a change in the pushing force to the wound element 50 by the electricity collecting plate can be minimized.

A sixth embodiment of the present invention will be described with reference to FIG. 6. This embodiment is a modification of the fifth embodiment, and the main different point from the fifth embodiment is as follows. The electricity collecting plate 73 is put in the casing to set it at the bottom portion of the casing. Then, an outer periphery of a side wall of the casing at a position slightly above the electricity collecting plate 73 is squeezed to form a neck portion whereby the electricity collecting plate 73 is firmly fixed to the casing 60. The pressure of the electricity collecting plate 73 located in the bottom portion in the same manner as the fifth embodiment can prevent the bottom portion of the casing from swelling. Further, since the electricity collecting plate 73 is firmly fixed to the casing 60 by forming the neck portion, an anti-vibration property can remarkably be improved.

A seventh embodiment of the present invention will be described with reference to FIG. 7. The main different point from the above-mentioned embodiments is such that the casing 60 comprises a cylindrical side wall portion and a bottom portion 64 which are made separately, and the bottom portion 64 is hermetically connected to the side wall portion by means of welding or the like. The bottom portion 64 is a circular plate member having a high rigidity which also serves as an electricity collecting plate. Similarly, the opening sealing cover 64 is made of a circular plate member having a high rigidity in the same manner as the bottom portion 64, which also serves as an electricity collecting plate. The opening sealing cover 64 is hermetically connected to a cylindrical side wall portion of the casing by means of welding or the like.

With the above-mentioned structure, the electricity collecting plate for the positive electrode and the electricity collecting plate for the negative electrode can be circular plates having a high rigidity, and the occupation rate of electrode can be improved whereby an electric double layer capacitor having a high capacity density per volume can be provided. Further, since the opening sealing cover 65 is hermetically connected to the casing by welding, a sealing property can be improved.

The winding core 40 used for a preferred embodiment of the present invention, which may be a hollowed shape or a solid shape, should be made of a material having an anti-corrosive property to the electrolyte and a high mechanical strength. Preferred material used may be, for example, polyethylene, polypropylene, urea resin, polyacetal, poly(meth)acrylate, nylon resin, polyimide resin, polyurethane, fluoro resin such as polytetrafluoroethylene or polyvinylfluoride. However, metal such as aluminum, aluminum alloy, cast iron, stainless steel, copper, nickel, titanium, tantalum, Monel, Hastelloy or the like is preferable, in particular, aluminum of light weight is more preferable.

As shown in FIG. 9, the winding core 40 made of metal comprises the upper portion 42 which is to be electrically connected to the positive electricity collecting material 31a of the wound element 50, the lower portion 41 which is to be electrically connected to the negative electricity collecting material 32a and the bottom portion 62 of the metallic casing 60. In order to prevent a short-circuit phenomenon in this case, the upper portion 42 and the lower portion 41 are separately prepared, and the intermediate portion 43 made of an insulating material is connected as an insulative connecting means between the upper and lower portions 41, 42. The upper portion 42 and the insulative connecting means 43, and the lower portion 41 and the insulative connecting means 43 are respectively connected to each other by means of screws and/or fitting. The insulative connecting member 43 is preferably of resin having high heat resistance and strength, such as polyimide resin, polyparaphenylene sulfide or the like. The upper portion 42 and the lower portion 41 both made of metal can suffer a large rotational driving force to the winding core 40 when the winding operations are conducted.

As a preferable embodiment of the winding core 40 onto which a separator is attached, a slit 45 is formed in the outer periphery of the winding core 40 in its axial direction and an end of a belt-like separator 33a (33b) is fixedly inserted into the slit 45, or an end of the separator 33a (33b) is directly bonded to the outer periphery of the winding core 40. By using such technique, the winding core 40 and the wound element 50 are formed in one piece whereby there is no danger of causing slippage of wound elements around the winding core 40 when the wound elements are wound. Further, since the wound elements are tightly wound, the positive electrode 31, the separators 33a, 33b and the negative electrode 32 constitute a solid cylindrical assembly due to a frictional force. Accordingly, even when the wound element 50 is compressed in its axial direction between the positive electricity collecting plate and the negative electricity collecting plate, there is no danger of causing slippage between the positive and negative electrodes 31, 32, and the belt-like portions 31ax, 32ax are crushed to be in forcible contact with the electricity collecting plates.

In a case of using a metallic winding core, the separator 33a or 33b should be located in the innermost portion in the wound element 50. Further, the separator 33a or 33b should also be located in the outermost portion in the wound element 50. Thus, the wound element 50 in which the belt-like electrodes 31, 32 are wound by interposing the separators 33a, 33b is preferably formed.

After the wound element 50 is put into the casing 60, the electrolyte is introduced. The opening sealing cover 63 is put on the casing 60 followed by caulking an upper edge of the casing 60 to fix the opening sealing cover 63 and hermetically seal the casing 60, whereby an electric double layer capacitor is formed. For the purpose of releasing gas generated when the electrolyte introduced, the central bore 44 is formed in the winding core 40 as shown in FIG. 10a, or a cut portion may be formed in the outer circumference of the winding core 40 along its axial line.

Material for the electricity collecting plates 72, 73 may be the same as that for the electrodes 31, 32. For example, aluminum, an aluminum alloy, cast iron, stainless steel, copper, nickel, titanium, tantalum, Monel, Hastelloy or the like is preferably used. The shape of the electricity collecting plates 72, 73 is not in particular limited. For example, they may be circular plates having a sufficient rigidity on which a disc-like foil is attached, or they may be circular plates having rigidity made of any of the above-mentioned material. Besides using the circular plates, they may be of a polygonal shape with or without a plurality of openings (such as openings 72a shown in FIG. 5(b)) or with or without a plurality of cut portions (such as cut portions 72(b) shown in FIG. 11) at their outer peripheries. Typically, use of a cross shape is preferable as shown in FIG. 11. When the electricity collecting plate 72, 73 have the openings or the cut portions, impregnation of the wound element 50 with the electrolyte can be easy, and the presence of the openings or the cut portions can reduce gas generated inside the casing when the electrolyte is introduced. When gas in the casing is drawn with a vacuum pump before the introduction of the electrolyte, a sufficient impregnation is obtainable.

The electricity collecting materials 31a, 32a used in the present invention may be of an electrically conductive material having anti-corrosion properties in terms of electrochemistry and chemistry, and graphite, an anti-corrosive metal or the like may be used. In particular, when a non-aqueous electrolyte is used, a metallic foil such as aluminum, stainless steel, nickel, tantalum or the like may be used. Use of an aluminum foil is in particular preferable. In the present invention, the electricity collecting materials are preferably comprised of a metallic foil having a thickness ranging from about 10 $\mu$m–0.5 mm. When the metallic foil has a roughened surface, good contact between the electrode layers and the electricity collecting materials is achieved.

As described before, the electrode layers 31b, 31c, 32b, 32c are formed on both surfaces of the metallic electricity collecting materials 31a, 32a. Each of the electrode layers is formed as follows. In carbon powder having a large specific surface area such as activated carbon, polyacene (specific surface area of about 800–3,500 $m^2$/g) as the major component, carbon black or carbon wisker as an electric conductive material and polytetrafluoroethylene, polyvinylidene fluoride, carboxymethylcellulose or the like as a binder are added to prepare a mixture. The mixture is kneaded in the presence of a fluid lubrication agent such as alcohol followed by pressing with a roller to thereby form a sheet-like molded product, the sheet-like molded product is dried, and it is bonded to each face of the metallic electricity collecting material by heat pressing or with an electric conductive adhesive agent. The thickness of the electrode layer is not in particularly limited, however, a thickness of about 100–500 $\mu$m is generally used.

Instead of using the above-mentioned kneading technique, a solvent (water, N-methylpyrrolidone or the like) for a binder may be mixed to prepare slurry, and the slurry is coated on both surfaces of the metallic electricity collecting material followed by drying whereby the electrode layers are formed.

The separators 33a, 33b may be porous separators which allow ions to pass therethrough. As an example of material for the separators, a fine porous polyethylene film, a fine porous polypropylene film, a polyethylene non-woven fabric, a polypropylene non-woven fabric, a glass fiber-mixed non-woven fabric, a glass mat filter, a cellulose type non-woven fabric, a rayon type non-woven fabric or the like is preferably used.

Into the casing 60 in which the wound element 50 is housed, the electrolyte is introduced to impregnate the electrodes 31, 32 with the electrolyte, and an upper edge of the metallic casing 60 is caulked onto the opening sealing cover 63 to hermetically seal the casing 60 whereby an electric double layer capacitor is formed. In caulking operations, it is preferable to use a gasket of insulating material such as silicon rubber, butyl rubber, ethylene-propylene rubber, polypropylene or the like. The electrolyte may be introduced through an injection hole formed in the opening sealing cover after having been sealed.

The electrolyte used may be of a well known type. As an aqueous solution type, sulfuric acid aqueous solution, sodium sulfate aqueous solution, sodium hydroxide aqueous solution, potassium hydroxide aqueous solution, ammonium hydroxide aqueous solution, potassium chloride aqueous solution, potassium carbonate aqueous solution or the like may be mentioned.

It is preferred for an organic solvent type to use a solution of a $BF_4$ salt, $ClO_4$ salt or a $PF_6$ salt of e.g. a quaternary ammonium ion or a quaternary phosphonium ion of the formula $R^1R^2R^3R^4N^+$ or $R^1R^2R^3R^4P^+$ (wherein each of $R^1$, $R^2$, $R^3$ and $R^4$ is a $C_{1-6}$ alkyl group which may be the same or different) or a salt of e.g. $LiBF_4$, $LiClO_4$, $NaPF_6$ or $LiPF_6$ in at least one organic solvent such as propylene carbonate, ethylene carbonate, $\gamma$-butyrolactone, acetonitrile, dimethylformamide, sulfolane, 1,2-dimethoxyethane, nitromethane, dimethylcarbonate, diethylcarbonate, diethylmethylcarbonate, dimethylethylcarbonate or the like.

Material for the casing 60 may be the same as that for the positive and negative electrodes 31, 32 or the electricity collecting plates 72, 73. However, aluminum, an aluminum alloy or stainless steel is preferred to use. In particular, for the electric double layer capacitor according to the first and sixth embodiment, material which is difficult to break in the formation of the neck portion and assures sufficiently a force to press the wound element 50 by means of the neck portion is preferred. From this viewpoint, use of stainless steel is desirable.

As described above, in accordance with the present invention, since the belt-like portions of the first and second electrodes of the cylindrically wound element are wound so that they are located respectively opposite ends of the wound element, and the first and second electricity collecting plates are respectively in contact with the belt-like portions of the first and second electrodes to collect electricity, tab-shaped electricity collecting leads are not in particular required whereby processing is easy and a time for manufacturing can be shortened.

Further, since a space for receiving the tab-shaped electricity collecting leads is not required, an electric double layer capacitor having high capacity density per volume can be provided.

Further, use of the winding core assures relative positions in axial directions of the first and second electricity collecting plates, and assures good contact between the wound element and the electricity collecting plates.

Further, by bringing the first and second electricity collecting plates into the belt-like portions of the first and second electrodes respectively, a variation in a pressure applied by the winding core can be minimized to thereby minimize a change in electric resistance at the contacting areas.

In accordance with the present invention, since the occupation rate in the cylindrical casing for receiving therein the wound element can be increased to improve the capacity density, an electric double layer capacitor suitable for a driving a power source mounted on an electric car or the like and having a large capacity and high output can be provided.

What is claimed is:

1. An electric double layer capacitor which comprises:
   a first electrode comprising a belt-like electricity collecting material having at least one surface on which an electrode layer is formed leaving a belt-like portion in a side of the belt-like electricity collecting material along its longitudinal direction, a second electrode comprising a belt-like electricity collecting material having at least one surface on which an electrode layer is formed leaving a belt-like portion in a side of the belt-like electricity collecting material along its longitudinal direction, belt-like separators interposed between the first electrode and the second electrode to electrically insulate them, a post-like winding core having two ends, on which the first electrode, the second electrode and the separators are wound to thereby form a cylindrically wound element, a first electricity collecting plate in contact with the belt-like portion of the first electrode to collect electricity, and a second electricity collecting plate in contact with the belt-like portion of the second electrode to collect electricity, wherein the belt-like portion of the first electrode and the belt-like portion of the second electrode are, respectively, at opposing positions in the cylindrically wound element, further wherein the two ends of the winding core are, respectively, in direct or indirect contact with the first electricity collecting plate and the second electricity collecting plate to determine the relative positions in axial directions of the first electricity collecting plate and the second electricity collecting plate are electrically insulated, and further wherein a casing of bottomed cylindrical form is provided to house the cylindrically wound element, a winding core receptor is fixed to a bottom portion of the casing, and the winding core is fixed to the casing by means of the winding core receptor.

2. The electric double layer capacitor according to claim 1, wherein the first electricity collecting plate and the second electricity collecting plate are respectively in forcible contact with the belt-like portion of the first electrode and the belt-like portion of the second electrode in the wound element.

3. The electric double layer capacitor according to claim 1, wherein the belt-like portion of the first electrode and the belt-like portion of the second electrode in the wound element are crushed toward an axial direction of the post-like winding core.

4. The electric double layer capacitor according to claim 1, wherein the first electrode and the second electrode respectively have electrode layers of substantially the same width in corresponding areas on both surfaces of the belt-like electricity collecting material in a front and back relation.

5. The electric double layer capacitor according to claim 1, wherein the winding core is a post-like member of cylindrical form which is constituted by an upper portion, an intermediate portion and a lower portion, the upper portion and the lower portion are made of metal, the intermediate portion is made of an insulating material, and the upper portion of the winding core is electrically insulated from the lower portion.

6. The electric double layer capacitor according to claim 1, wherein the winding core is a post-like member of cylindrical form and has a lower portion provided with an insulating material, the remaining major portion being made of metal, and both end portions of the winding core are respectively in contact with the first electricity collecting plate and the second electricity collecting plate to determine the relative positions in axial directions of the first electricity collecting plate and the second electricity collecting plate.

7. The electric double layer capacitor according to claim 6, wherein the second electricity collecting plate constitutes a bottom portion of the casing.

8. The electric double layer capacitor according to claim 1, wherein the winding core has a central bore, and lateral bores at an upper portion and a lower portion which are projected from the major portion of the wound element, the lateral bores being communicated with the central bore.

9. The electric double layer capacitor according to claim 1, wherein at least one of the first electricity collecting plate and the second electricity collecting plate has a cut portion.

10. The electric double layer capacitor according to claim 1, wherein at least one of the first electricity collecting plate and the second electricity collecting plate has an opening.

11. The electric double layer capacitor according to claim 1, wherein an opening sealing cover is provided to seal the opening of the casing, the first electricity collecting plate is constituted by the opening sealing cover, and the casing is electrically insulated from the sealing opening cover though an insulating material.

12. An electric double layer capacitor which comprises:

a first electrode comprising a belt-like electricity collecting material having at least one surface on which an electrode layer is formed leaving a belt-like portion in a side of the belt-like electricity collecting material along its longitudinal direction, a second electrode comprising a belt-like electricity collecting material having at least one surface on which an electrode layer is formed leaving a belt-like portion in a side of the belt-like electricity collecting material along its longitudinal direction, belt-like separators interposed between the first electrode and the second electrode to electrically isolate them, a post-like winding core having two ends, on which the first electrode, the second electrode, and the separators are wound to thereby form a cylindrically wound element, a first electricity collecting plate in contact with the belt-like portion of the first electrode to collect electricity, and a second electricity collecting plate in contact with the belt-like portion of the second electrode to collect electricity, wherein the belt-like portion of the first electrode and the belt-like portion of the second electrode are, respectively, at opposing portions in the cylindrically wound element, further wherein the two ends of the winding core are, respectively, in direct or indirect contact with the first electricity collecting plate and the second electricity collecting plate to determine the relative positions in axial directions of the first electricity collecting plate and the second electricity collecting plate, and the first electricity collecting plate and the second electricity collecting plate are electrically insulated, and further wherein at least one of the first electricity collecting plate and the second electricity collecting plate has a plurality of needle-like projections at a side where the cylindrically wound element contacts.

13. An electric double layer capacitor which comprises:

a first electrode comprising a belt-like electricity collecting material having at least one surface on which an electrode layer is formed leaving a belt-like portion in a side of the belt-like electricity collecting material along its longitudinal direction, a second electrode comprising a belt-like electricity collecting material having at least one surface on which an electrode layer is formed leaving a belt-like portion in a side of the belt-like electricity collecting material along its longitudinal direction, belt-like separators interposed between the first electrode and the second electrode to electrically insulate them, a post-like winding core having two ends, on which the first electrode, the second electrode, and the separators are wound to thereby form a cylindrically wound element, a first electricity collecting plate in contact with the belt-like portion of the first electrode to collect electricity, and a second electricity collecting plate in contact with the belt-like portion of the second electrode to collect electricity, wherein the belt-like portion of the first electrode and the belt-like portion of the second electrode are, respectively, at opposing positions in the cylindrically wound element, further wherein the two ends of the winding core are, respectively, in direct or indirect contact with the first electricity collecting plate and the second electricity collecting plate to determine the relative positions in axial directions of the first electricity collecting plate and the second electricity collecting plate, and the first electricity collecting plate and the second electricity collecting plate are electrically insulated, and further wherein a slit is formed in a peripheral portion of the winding core along its axial center line.

14. The electric double layer capacitor according to claim 13, wherein a cylindrical casing is provided to house the cylindrically wound element, said casing has a bottom cover at its one end and an opening sealing cover at its other end, said cylindrically wound element is between the bottom cover and the opening sealing cover, and the cylindrically wound element is fixed in the casing by means of the winding core.

15. The electric double layer capacitor according to claim 13, wherein a metallic casing of bottomed cylindrical form is provided to house the cylindrically wound element, the second electricity collecting plate is placed at a bottom side of the casing and is a circular plate having an outer diameter which is substantially the same as an inner diameter of the casing at a position near its bottom portion, and the outer diameter portion of the second electricity collecting plate has knurled lines in a direction parallel to the center line of the circular plate, the knurled lines biting an inner wall portion of the casing to fix the second electricity collecting plate in the casing.

16. The electric double layer capacitor according to claim 13, wherein a metallic casing of bottomed cylindrical form is provided to house the cylindrically wound element, and at least one of the first electricity collecting plate and the second electricity collecting plate is fixed to the casing by forming an inwardly drawn neck portion in a side wall portion of the casing at a position slightly above the electricity collecting plate.

* * * * *